(12) United States Patent
Andarawis et al.

(10) Patent No.: US 8,253,587 B2
(45) Date of Patent: Aug. 28, 2012

(54) POWER FREE REMOTE SENSOR SYSTEM DATA TRANSMISSIONS

(75) Inventors: Emad Andarawis, Ballston Lake, NY (US); Ertugrul Berkcan, Clifton Park, NY (US); Samantha Rao, Bangalore (IN); Eladio Delgado, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 691 days.

(21) Appl. No.: 12/365,407

(22) Filed: Feb. 4, 2009

(65) Prior Publication Data
US 2010/0194591 A1    Aug. 5, 2010

(51) Int. Cl.
*G05B 23/02* (2006.01)
(52) U.S. Cl. .................................................. 340/870.16
(58) Field of Classification Search .................. 340/3.1, 340/870.16
See application file for complete search history.

(56) References Cited

U.S. PATENT DOCUMENTS

| | | | | |
|---|---|---|---|---|
| 7,276,703 | B2 * | 10/2007 | Berkcan et al. | 250/358.1 |
| 7,571,058 | B2 * | 8/2009 | Sealing et al. | 702/34 |
| 2010/0141377 | A1 * | 6/2010 | Andarawis et al. | 340/3.1 |

FOREIGN PATENT DOCUMENTS
WO     00/50849 A1   8/2000

OTHER PUBLICATIONS

European Search Report dated Aug. 6, 2011; Reference FB22755/G12508EP; Application No. 10152473.4-1246/2219386.

* cited by examiner

*Primary Examiner* — Danny Nguyen
(74) *Attorney, Agent, or Firm* — Bracewell & Giuliani LLP

(57) ABSTRACT

A system and method to monitor the condition of a structure is provided. In one embodiment, a sensor node can include a power supply that can scavenge available energy, a sensor for sensing conditions in the immediate environment, and a communications interface for communicating the sensed operating conditions. Readers can be used to acquire data from the sensor nodes. In one embodiment, the readers can determine if the data from the sensor nodes is an exception and, if so, determine whether trend data is sufficient.

27 Claims, 18 Drawing Sheets

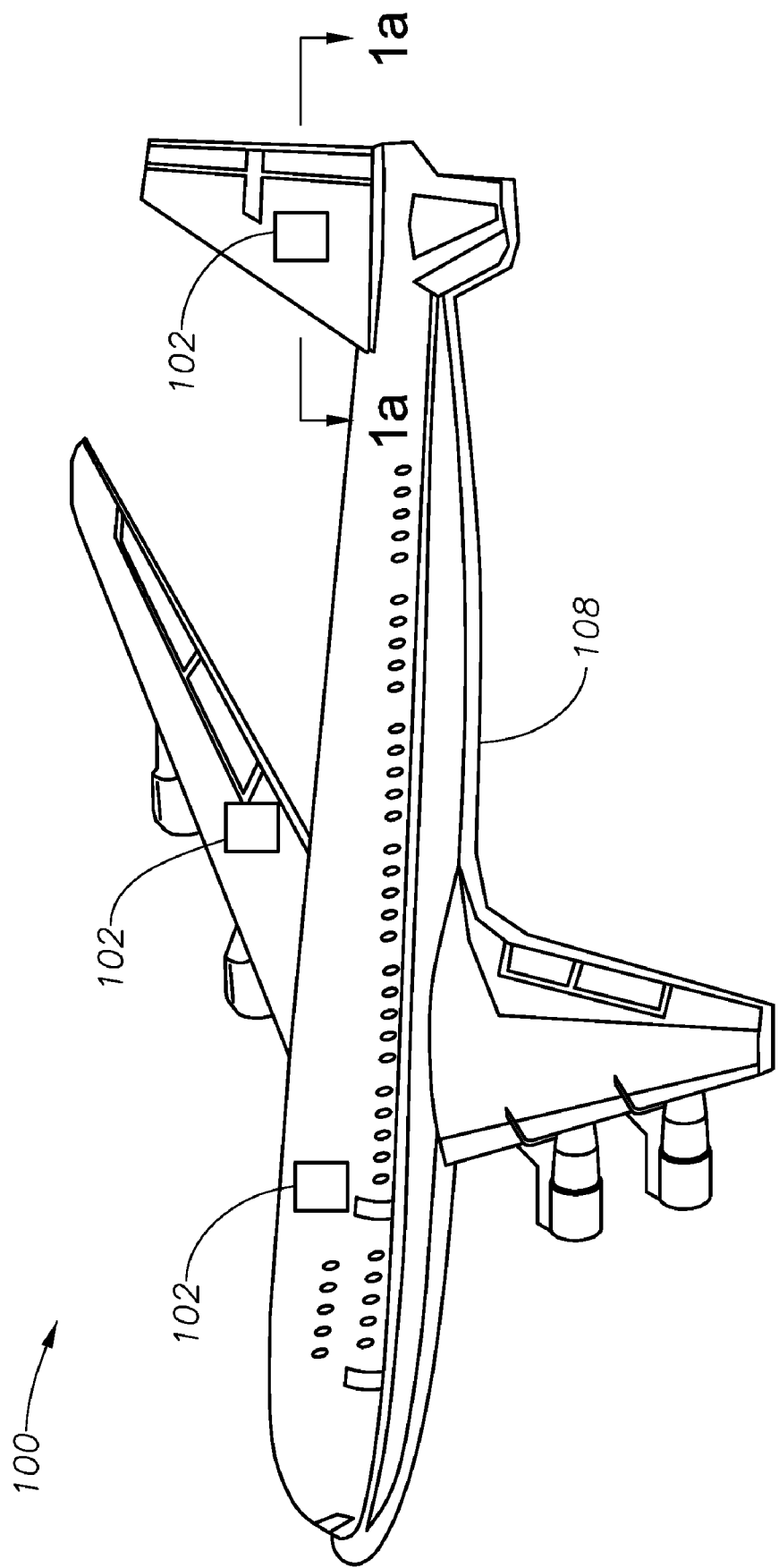

POWER FREE REMOTE SENSOR SYSTEM DATA TRANSMISSIONS

CROSS-REFERENCE TO RELATED APPLICATIONS

The present application is related to patent application Ser. No. 12/208,222, filed on Sep. 10, 2008, and patent application Ser. No. 12/331,908, filed on Dec. 10, 2008, the disclosures of which are incorporated by reference.

BACKGROUND

This disclosure relates to distributed monitoring systems for a structure.

BRIEF DESCRIPTION OF THE DRAWINGS

FIG. 1 is an illustration of an exemplary embodiment of an aircraft monitoring system.

FIG. 14b is a schematic illustration of the aircraft monitoring system of FIG. 14a.

DETAILED DESCRIPTION

Figure 1A:
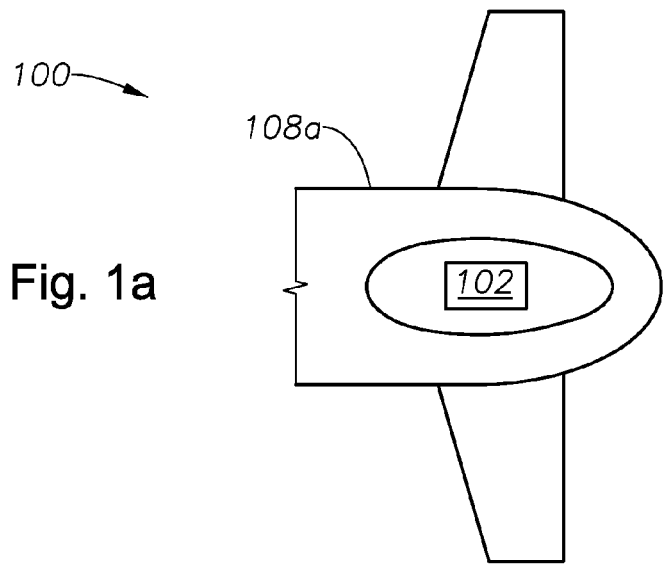
FIG. 1a is a fragmentary cross sectional illustration of a portion of the aircraft of the system of FIG. 1.
Figure 2:
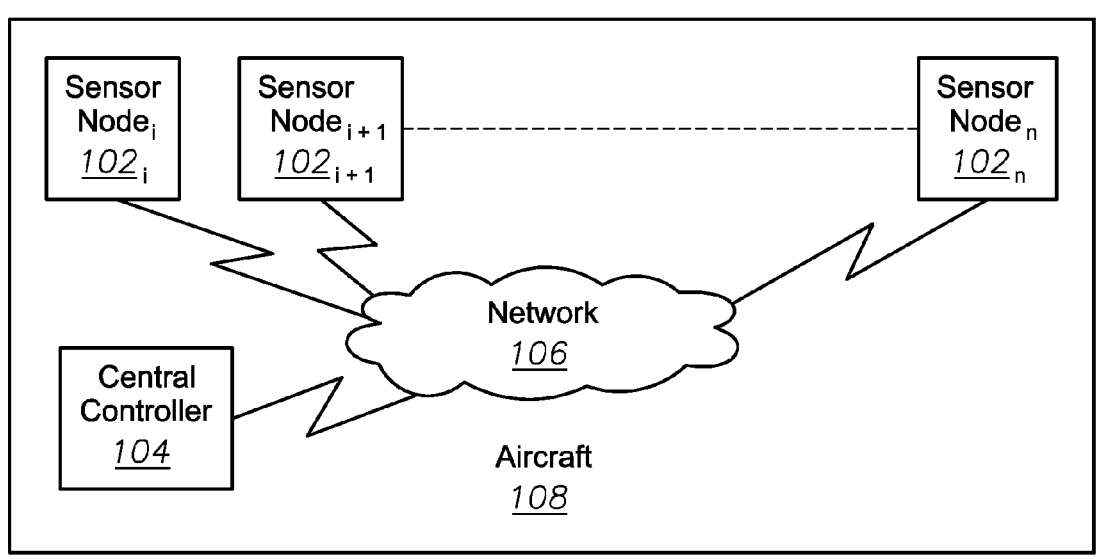
FIG. 2 is a schematic illustration of the aircraft monitoring system of FIG. 1.
Figure 3:
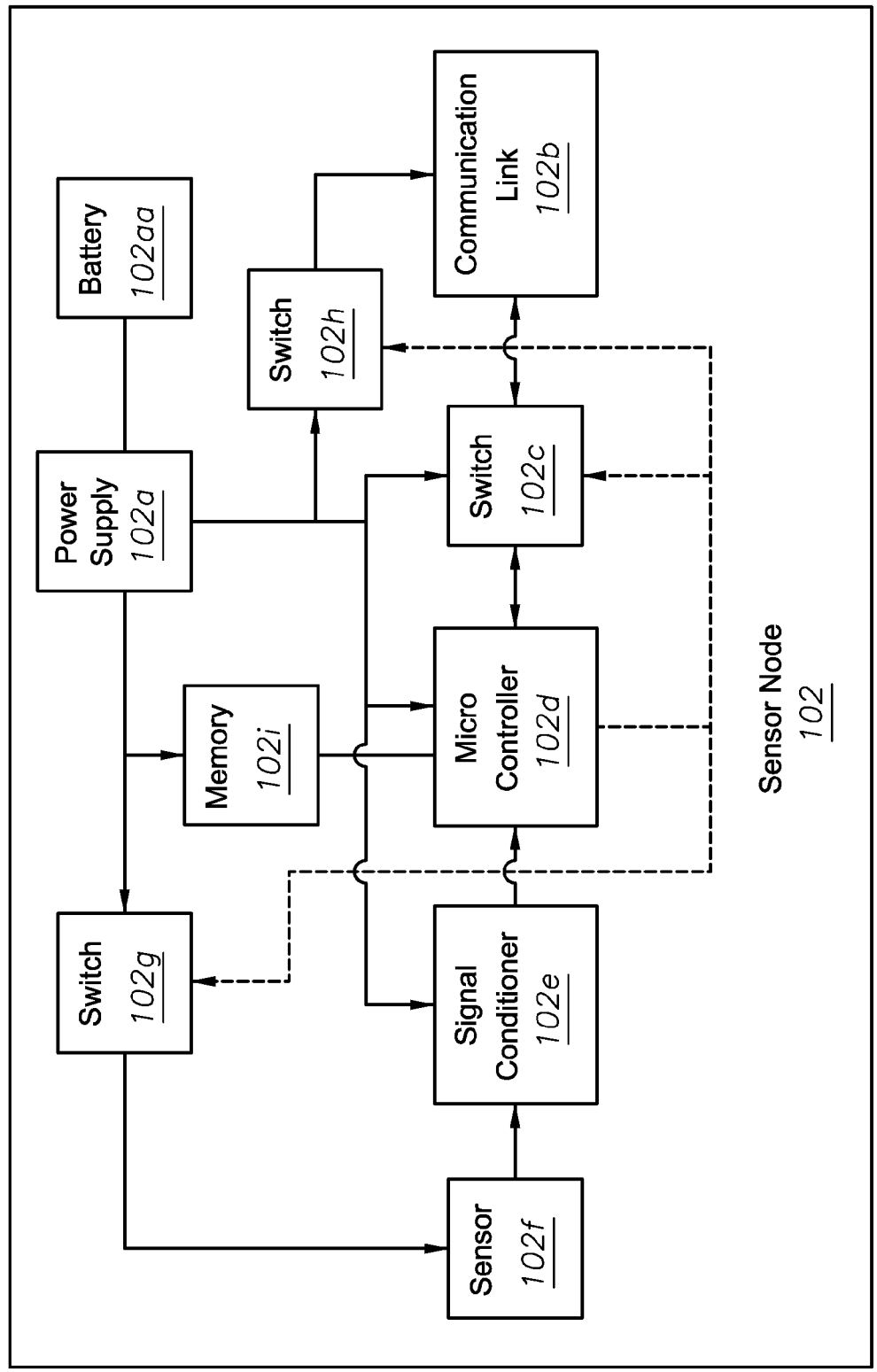
FIG. 3 is a schematic illustration of an exemplary embodiment of sensor nodes of the aircraft monitoring system of FIG. 2.

In the drawings and description that follows like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring to FIGS. 1, 1a, 2, and 3, an exemplary embodiment of a system 100 for monitoring an aircraft includes one or more sensors nodes 102 that are operably coupled to a central controller 104 by a network 106. In an exemplary embodiment, the sensor nodes 102 are distributed within an aircraft 108 for monitoring one or more operational states of the aircraft that may, for example, include stresses, strains, temperatures, and pressures. In an exemplary embodiment, one or more of the sensor nodes 102 communicate the operational states of the aircraft 108 to the central controller 106 that is housed within the aircraft using, for example, a network 106 that may, for example, include a hard wired, fiber optic, infra red, radio frequency, packet data, acoustic, or other communication pathway.

In an exemplary embodiment, the sensor nodes 102 may be positioned on the surface of the aircraft 108 and/or, as illustrated in FIG. 1a, positioned within one or more of the sections 108a of the aircraft. Furthermore, in an exemplary embodiment, the sections 108a of the aircraft may be sub-sections of the aircraft 108 that include sensor nodes 102 and which may, or may not, be fabricated into the overall structure of the aircraft. In this manner, the section 108a may be fabricated as a sub-section of the aircraft 108 and then may be incorporated into the overall structure of the aircraft during the manufacturing process of the overall structure of the aircraft or may be fabricated to provide a spare part supply to permit later repair and/or modification of the aircraft.

In an exemplary embodiment, each sensor node 102 includes a power supply 102a that is adapted to scavange energy from the immediate environment. In an exemplary embodiment, the power supply 102a may, for example, scavenge electromagnetic energy, solar energy, radio-frequency energy, vibrational energy, heat energy, and/or wind energy from the immediate environment. In an exemplary embodiment, the power supply 102a further includes an energy storage device such as, for example, a rechargeable battery 102aa and/or a capacitor operably coupled thereto. In this manner, short bursts of energy that may be scavenged can be scavenged by the power supply 102a and stored for later use in the battery 102aa. In an exemplary embodiment, the power supply 102a is operably coupled, and supplies power, to a communication link 102b, a switch 102c, a micro-controller 102d, a signal conditioner 102e, a sensor 102f, a switch 102g, a switch 102h, and a memory 102i.

In an exemplary embodiment, the communication link 102b is also operably coupled to the switch 102c and adapted to transmit and receive communication signals between the sensor node 102 and the network 106. In this manner, the sensor node 102 may communicate with other sensor nodes and the central controller 104.

In an exemplary, the switch 102c is also operably coupled to the communication link 102b and the micro-controller 102d and adapted to be controlled by the micro-controller to thereby communications between the communication link and the micro-controller. In this manner, in the event that the micro-controller 102d determines that communication should not occur between the communication link 102b and the micro-controller such as, for example, if the sensor node 102 lacks sufficient power, the micro-controller may operate the switch to prevent communication between the communication link and the micro-controller.

In an exemplary embodiment, the micro-controller 102d is also operably coupled to the communication link 102b, the switch 102c, the signal conditioner 102e, the sensor 102f, and the switch 102g for monitoring and controlling the operation of each. In an exemplary embodiment, the micro-controller 102d may include, for example, a conventional general purpose programmable controller.

In an exemplary embodiment, the signal conditioner 102e is also operably coupled to the micro-controller 102d and the sensor 102 and adapted to condition signals transmitted by the sensor before they are further processed by the micro-controller. In an exemplary embodiment, the signal conditioner 102e may, for example, include one or more conventional signal processing elements such as, for example, filters, amplifiers, and analog to digital converters.

In an exemplary embodiment, the sensor 102f is also operably coupled to the signal conditioner 102e and the switch 102g and adapted to sense one or more operating conditions of the aircraft 108 in the immediate environment. In an exemplary embodiment, the sensor 102f may include, for example, one or more of the following: a strain gauge, a stress sensor, a temperature gauge, a pressure gauge, an radiation detector, a radar detector, and/or a detector of electromagnetic energy.

In an exemplary embodiment, the switch 102g is also operably coupled to the micro-controller 102d and the sensor 102f and adapted to control the operation of the sensor under the controller of the micro-controller. In this manner, in the event that the micro-controller 102d determines that the sensor 102f should not operate such as, for example, if the sensor node 102 lacks sufficient power, the micro-controller may operate the switch 102g to prevent power from being supplied by the power supply 102a to the sensor.

In an exemplary embodiment, the switch 102h is also operably coupled to the micro-controller 102d and the communication link 102b and adapted to control the operation of the communication link under the controller of the micro-controller. In this manner, in the event that the micro-controller 102d determines that the communication link 102b should not operate such as, for example, if the sensor node 102 lacks sufficient power, the micro-controller may operate the switch 102h to prevent power from being supplied by the power supply 102a to the communication link.

In an exemplary embodiment, the memory 102i is also coupled to the micro-controller 102d in order to store the operating system of the sensor node 102 as well as other operating parameters and measurements taken by the sensor 102f. The memory 102i may, for example, include one or more conventional memory devices such as, for example, DRAMS, Flash memory, optical storage, hard disk drive, or other memory devices. In an exemplary embodiment, the memory 102i is adapted to store at least one of the mechanical, electrical, chemical, bistable, or multi-stable states of the sensor 102f.

Figure 4A:
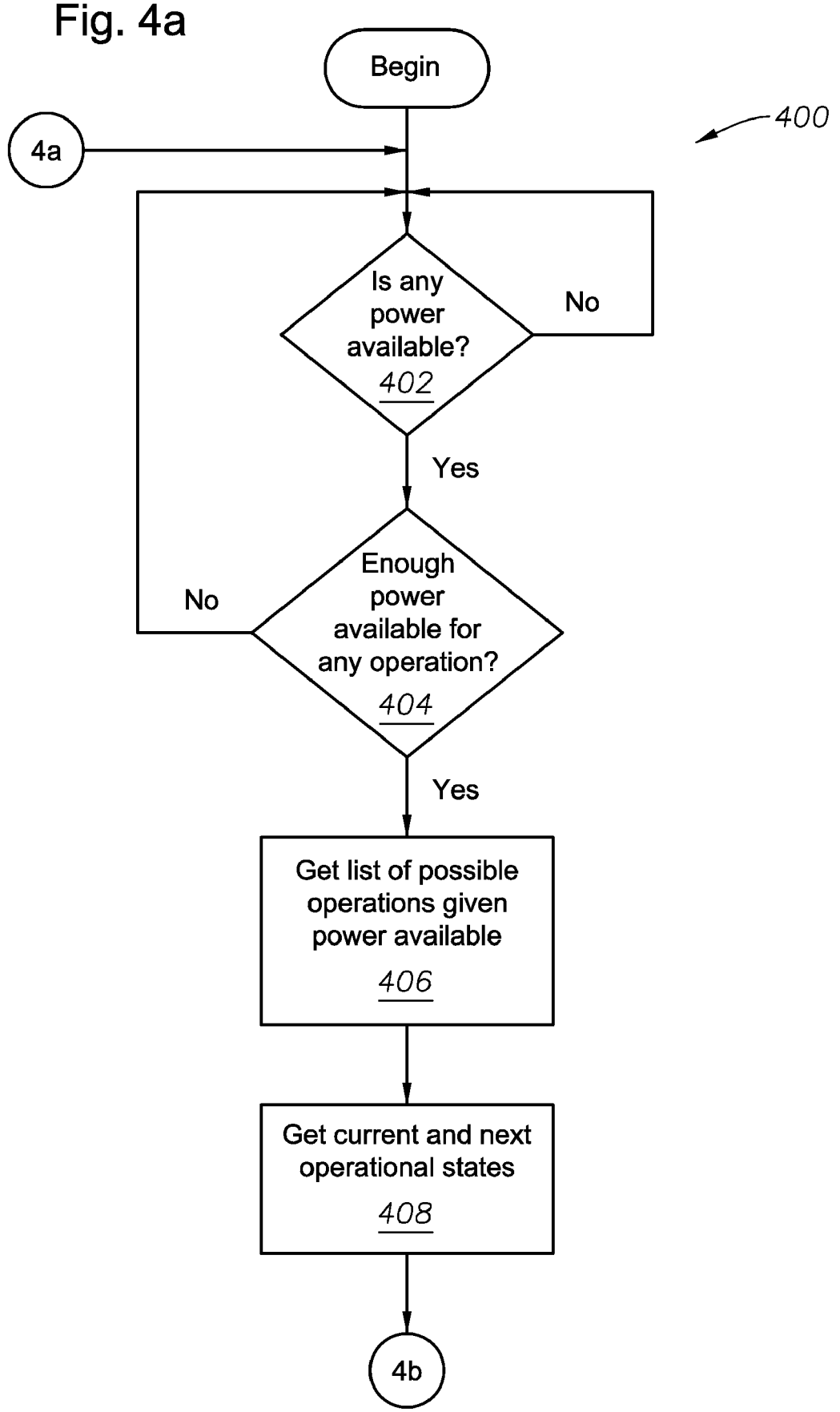
FIGS. 4a and 4b are flow chart illustrations of an exemplary embodiment of a method of operating the sensor nodes of FIG. 3.
Figure 4B:
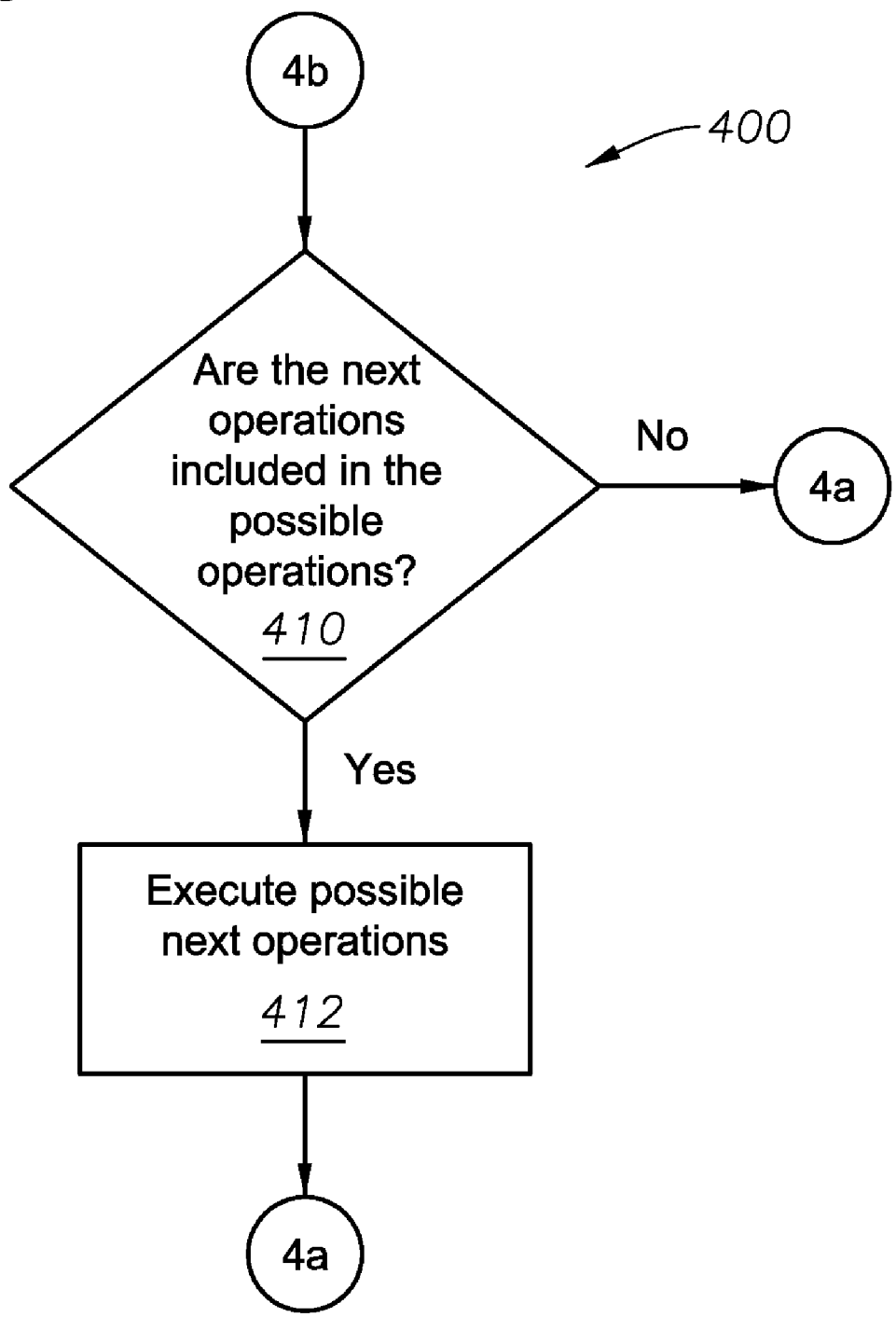

Referring now to FIGS. 4a and 4b, in an exemplary embodiment, one or more of the sensor nodes 102 of the system 100 implement a method 400 of operating in which, in 402, the sensor node determines if there is any power available to the sensor node. If there is any power available to the sensor node 102, then the sensor node determines if there is enough power available to the sensor node to permit the sensor node to execute at least one operation in 404.

If there is enough power available to permit the sensor node 102 to execute at least one operation, then the sensor gets a listing of the possible operations given the amount of available power in 406. The sensor node 102 then gets a listing of the current and next operational states for the sensor node in 408.

The sensor node 102 then determines if the next operational states of the sensor node are included in the possible operations given the amount of available power in 410. If the next operational states of the sensor node 102 are included in the possible operations given the amount of available power, then the sensor node executes the next operational states that are possible to execute given the amount of available power in 412.

Figure 5A:
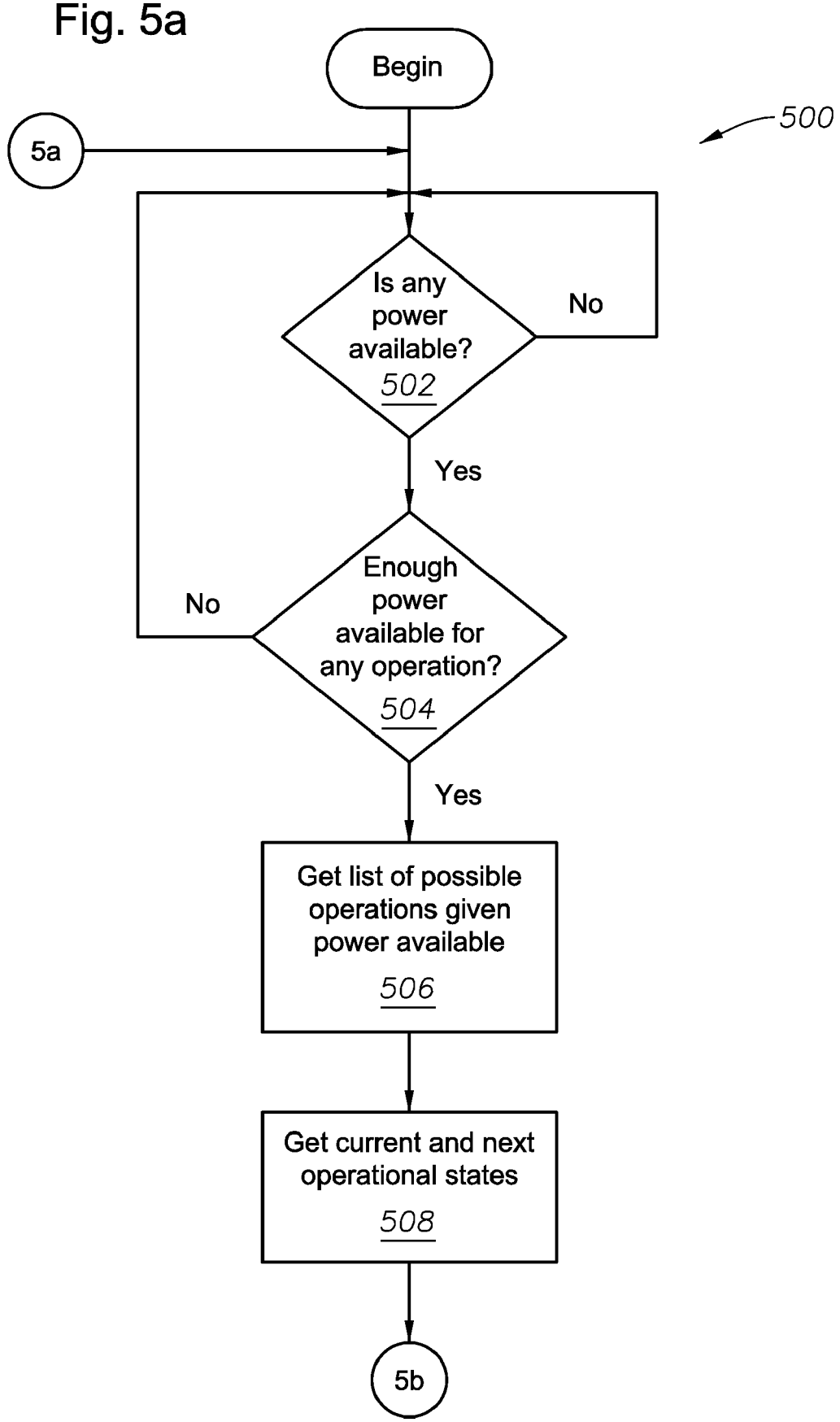
FIGS. 5a and 5b are flow chart illustrations of an exemplary embodiment of a method of operating the sensor nodes of FIG. 3.
Figure 5B:
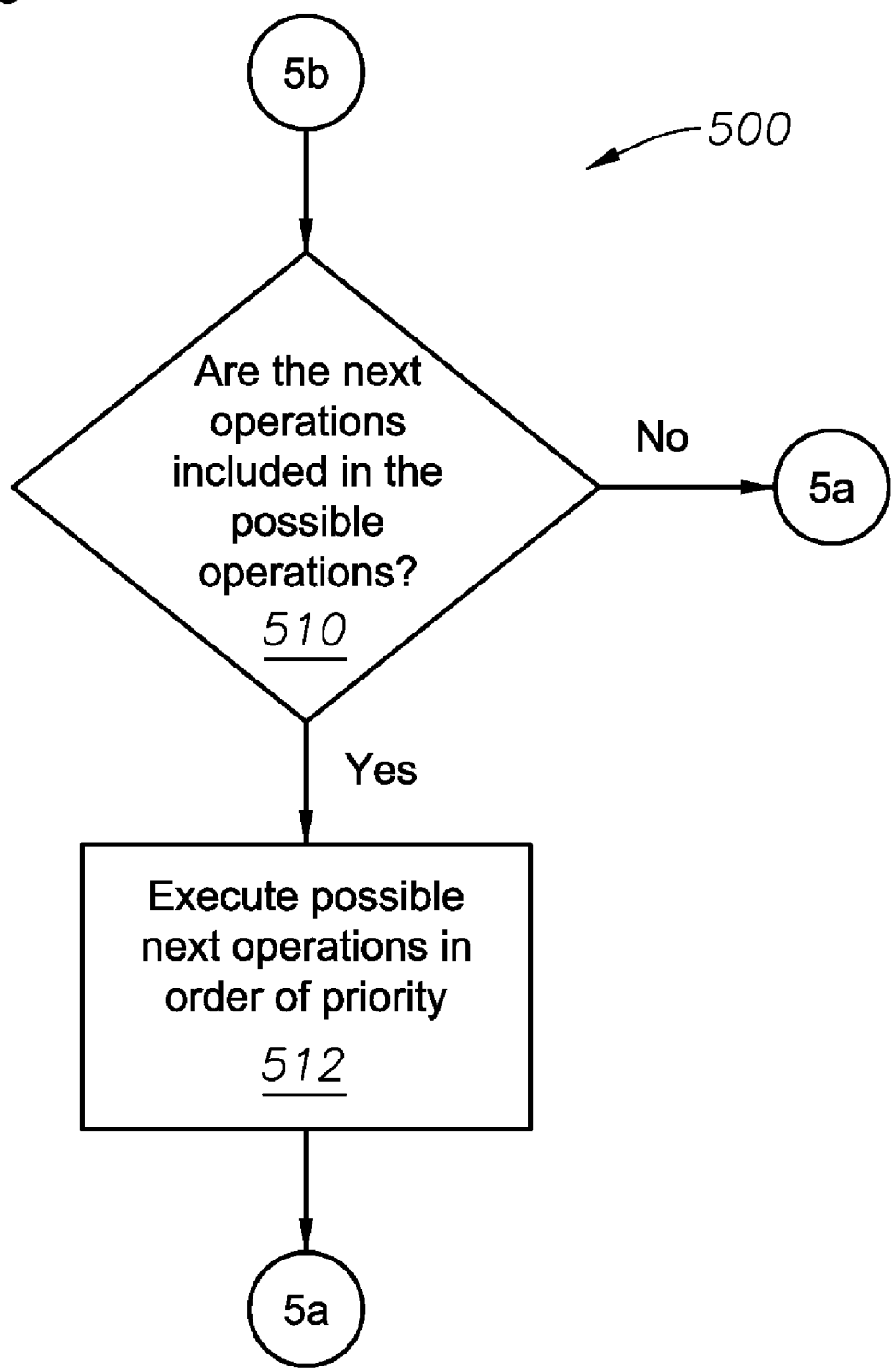

Referring now to FIGS. 5a and 5b, in an exemplary embodiment, one or more of the sensor nodes 102 of the system 100 implement a method 500 of operating in which, in 502, the sensor node determines if there is any power available to the sensor node. If there is any power available to the sensor node 102, then the sensor node determines if there is enough power available to the sensor node to permit the sensor node to execute at least one operation in 504.

If there is enough power available to permit the sensor node 102 to execute at least one operation, then the sensor gets a listing of the possible operations given the amount of available power in 506. The sensor node 102 then gets a listing of the current and next operational states for the sensor node in 508.

The sensor node 102 then determines if the next operational states of the sensor node are included in the possible operations given the amount of available power in 510. If the next operational states of the sensor node 102 are included in the possible operations given the amount of available power, then the sensor node executes the next operational states, based upon their pre-determined priority, that are possible to execute given the amount of available power in 512.

Figure 6:
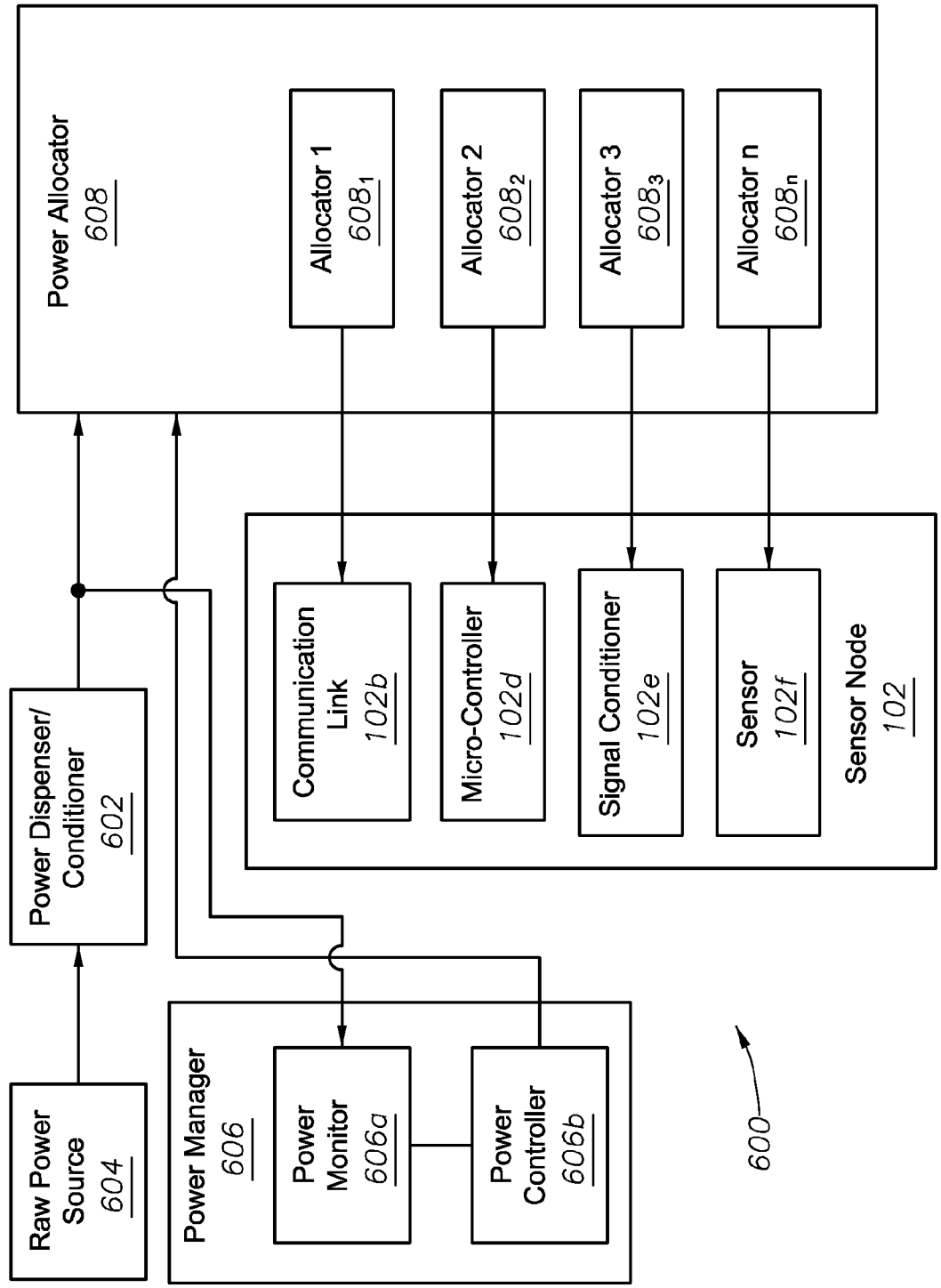
FIG. 6 is a schematic illustration of an exemplary embodiment of an aircraft monitoring system.

Referring now to FIG. 6, an exemplary embodiment of a system 600 for monitoring an aircraft is substantially identical in design and operation as the system 100 with the addition of a power dispenser and conditioner 602 that is operably coupled to a source of raw power 604, a power manager 606, a power allocator 608.

In an exemplary embodiment, the source of raw power 608 may include one or more of the power supplies 102a of one or more of the sensor nodes 102. In an exemplary embodiment, the power dispenser and conditioner 602 is adapted to receive time varying raw power, $P(t)_{raw}$, from the source of raw power 604, condition the raw power, and then transmit time varying available power, $P(t)_{avail}$, to the power allocator 608. In an exemplary embodiment, the power dispenser and conditioner 602 includes one or more elements for conditioning the raw power such as, for example, a rectifier and a filter.

In an exemplary embodiment, the power manager 606 includes a power monitor 606a and a power controller 606b. In an exemplary embodiment, the power monitor 606a is operably coupled to the output of the power dispenser and conditioner 602 for monitoring the available power, $P(t)_{avail}$. In an exemplary embodiment, the power monitor 606a is also operably coupled to the power controller 606b for communicating the available power, $P(t)_{avail}$, to the power controller. In an exemplary embodiment, the power controller 606b is also operably coupled to the power allocator 608 for controlling the operation of the power allocator.

In an exemplary embodiment, the power allocator 608 includes one or more allocators 608i that are each coupled to one or more elements of the sensor node 102 for controllably supplying power to the corresponding elements of the sensor node. In this manner, the power manager 606 and the power allocator 608 collectively determine the power available to the sensor node 102 and then allocate the available power to the elements of the sensor node.

In an exemplary embodiment, the system 600 may implement one or more aspects of the methods 400 and 500, described and illustrated above with reference to FIGS. 4a, 4b, 5a, and 5b. In an exemplary embodiment, the elements and functionality of the power dispenser and conditioner 602, the raw power source 604, the power manager 606, and the power allocator 608 may be provided within one or more of the sensor nodes 102 and/or provided within the central controller 104.

Figure 7:
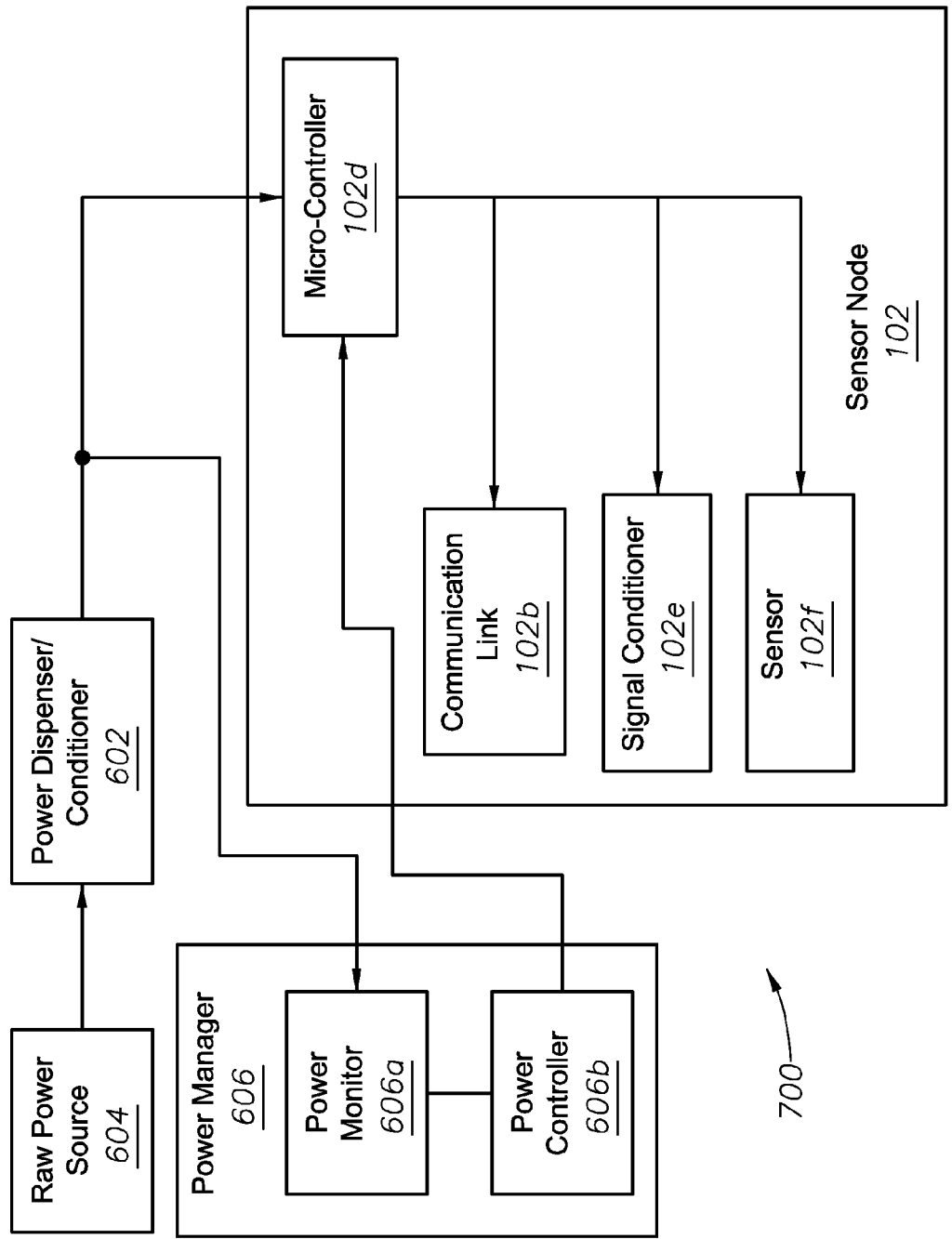
FIG. 7 is a schematic illustration of an exemplary embodiment of an aircraft monitoring system.

Referring now to FIG. 7, an exemplary embodiment of a system 700 for monitoring an aircraft is substantially identical in design and operation as the system 600 except that the power allocator 608 is omitted and the functionality formerly provided by the power allocator is provided by the micro-controller 102d within the sensor nodes 102.

In particular, in the system 700, the power controller 606b is operably coupled to the micro-controller 102d of the sensor node 102 for directing the allocation of the available power by the micro-controller to the elements of the sensor node.

In an exemplary embodiment, the system 700 may implement one or more aspects of the methods 400 and 500, described and illustrated above with reference to FIGS. 4a, 4b, 5a, and 5b. In an exemplary embodiment, the elements and functionality of the power dispenser and conditioner 602, the raw power source 604, and the power manager 606 may be provided within one or more of the sensor nodes 102 and/or provided within the central controller 104.

Figure 8:
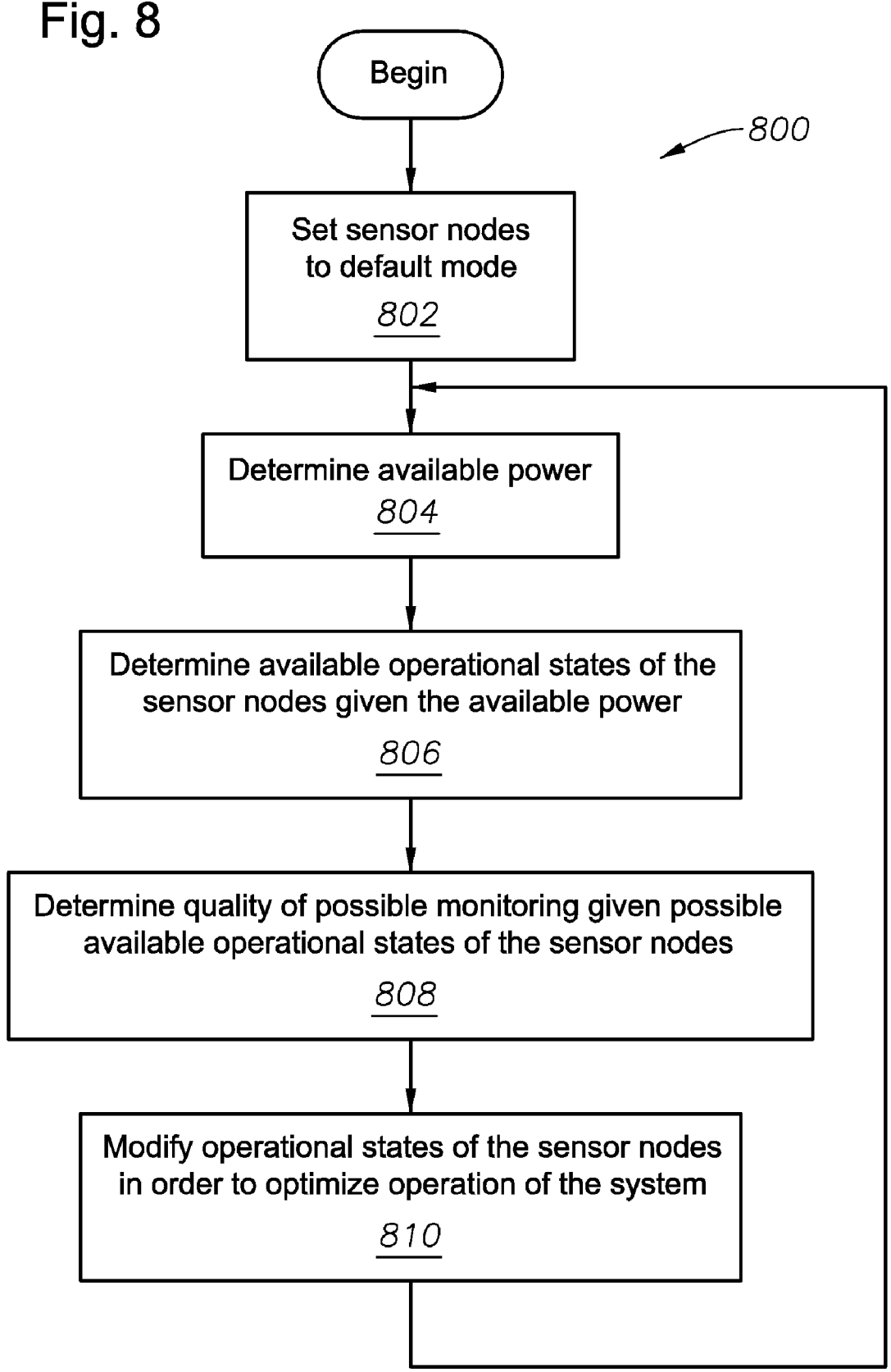
FIG. 8 is a flow chart illustration of a method of operating an aircraft monitoring system.

Referring now to FIG. 8, in an exemplary embodiment, one or more of the systems 100, 600, and 700 may implement a method 800 of operating in which, in 802, the sensor nodes 102 are placed into a default mode of operation which may, for example, include a sleep mode in which the sensor node is inactive, a fully active mode in which the sensor node is fully active, or one or more intermediate active modes in which the sensor node has functionality that is less than in the fully active mode. In 804, the system, 100, 600, or 700, will then determine the amount of power available to the system. In an exemplary embodiment, in 806, the system, 100, 600, or 700, will then determine the available operational states of the sensor nodes 102 of the system given the amount of power available to the system.

In an exemplary embodiment, in 808, the system, 100, 600, or 700, will then determine the quality of the possible monitoring of the aircraft 108 given the available operational states of the sensor nodes 102 of the system given the amount of power available to the system. In an exemplary embodiment, the quality of the possible monitoring of the aircraft 108 may be a function of what monitoring is adequate based upon the operating envelope and actual operating condition of the aircraft. For example, when the aircraft 108 is cruising at high altitudes with minimal turbulence, the level of detail and sampling rate in the monitored conditions may be less than when the aircraft is climbing to, or diving from, altitude with heavy turbulence.

In an exemplary embodiment, in 810, the system, 100, 600, or 700, will then modify the operational states of the sensor nodes 102 in order to optimize one or more of: 1) the available operational states of the sensor nodes, 2) the volume of data collected by the sensor nodes, 3) the sampling rate of the data collected by the sensor nodes, 4) the communication throughput of data within the network 106, and/or 5) the quality of the possible monitoring.

In an exemplary embodiment, during the operation of the systems, 100, 600 and/or 700, the switches, 102c, 102g and 102h, may be operated by the micro-controller 102d to place the sensor node 102 in a sleep mode by not permitting operation of the communication link 102b and the sensor 102f. In this manner, the use of power by the sensor node 102 is minimized.

In an exemplary embodiment, during the operation of the systems, 100, 600 and/or 700, the sensor node 102 may be operated in a sleep mode of operation that may, for example, include a range of sleeping mode that may vary from a deep sleep to a light sleep. In an exemplary embodiment, in a deep sleep mode of operation, the sensor node 102 may be completely asleep and then may be awakened by a watch dog timer, or other alert. In an exemplary embodiment, in a light sleep mode of operation, some of the functionality of the sensor node 102 may be reduced. In an exemplary embodiment, in one or more intermediate sleeping modes of operation, the functionality of the sensor node 102 will range from a light sleep to a deep sleep.

In an exemplary embodiment, in one or more of the systems 100, 600 and 700, one or more of the elements and functionality of the power dispenser and conditioner 602, the raw power source 604, the power manager 606, and the power allocator 608 may be provided within a sensor node 102, within one or more groups of sensor nodes, and/or within the central controller 104.

In an exemplary embodiment, in one or more of the systems, 100, 600 and 700, one or more of the elements and functionality of the raw power source 604 may be provided within a single sensor node 102, within one or more groups of sensor nodes, or by all of the sensor nodes. For example, if the power supply 102a in each of the sensor nodes 102 within one of the systems, 100, 600 or 700, is a solar cell, then the level of solar energy at each sensor node 102 will vary as a function of its location on the aircraft 108. In an exemplary embodiment, the allocation of power within the sensor nodes 102 of the systems, 100, 600 and 700, will determine the mapping of the power generated by the sensor nodes and then allocate power among the sensor nodes in order to optimize the operation of the systems in monitoring the aircraft 108.

In an exemplary embodiment, in one or more of the systems 100, 600 and 700, one or more of the sensor nodes 102 may provide one or more of the elements and functionality of the central controller 104.

In an exemplary embodiment, one or more of the systems 100, 600 and 700, may be operated to provide an optimal quality of the possible monitoring of the aircraft 108 by placing one or more determined sensor nodes 102 into a sleep mode, even in the presence of adequate power to operate the determined sensor nodes if the systems determine that the optimal quality of the possible monitoring of the aircraft can still be achieved. In this manner, the determined sensor nodes 102 placed into a sleep mode may do one or more of: store power or store data within the determined sensor node. In this manner, data may be warehoused within a sensor node 102 for later use and/or power may be stored within the sensor node for later use.

In an exemplary embodiment, one or more of the systems 100, 600 and 700, may be operated to place one or more determined sensor nodes 102 into a sleep mode if the data for the determined sensor node may be extrapolated using the data available for adjacent sensor nodes.

Figure 9:
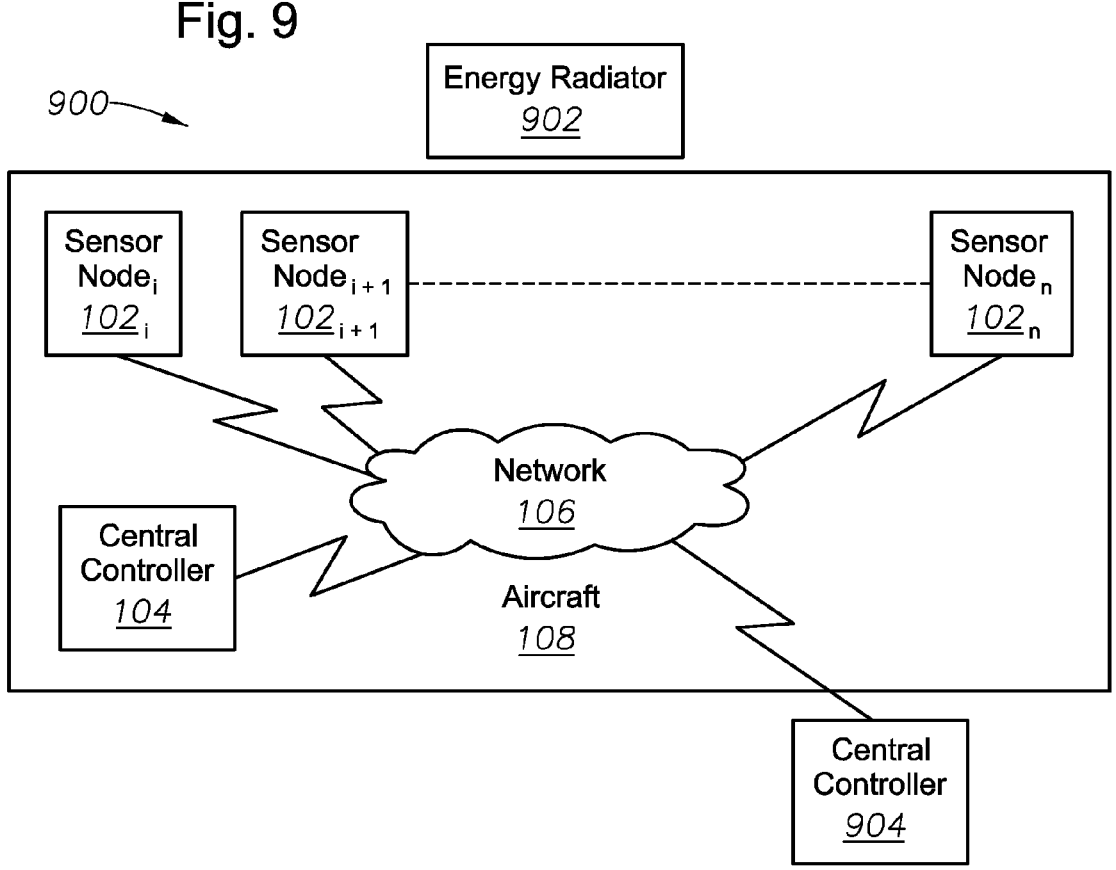
FIG. 9 is a schematic illustration of an exemplary embodiment of an aircraft monitoring system.

Referring now to FIG. 9, an exemplary embodiment of a system 900 for monitoring an aircraft is substantially identical in design and operation as the system 100 except that an energy radiator 902 is positioned proximate the aircraft 108 and a central controller 904 is operably coupled to the network 106.

In an exemplary embodiment, the energy radiator 902 includes one or more radiators of energy such as, for example, electromagnetic energy, solar energy, radio-frequency energy, vibrational energy, heat energy, and/or wind energy. In this manner, the energy radiator 902 may permit the power supplies 102a of the sensor nodes 102 to scavenge energy for operating the sensor nodes from the energy radiated by the energy radiator 902.

In an exemplary embodiment, the central controller 904 is operably coupled to the network 106 in order to monitor and control the operation of the sensor nodes 102. In an exemplary embodiment, the central controller 904 may include a plurality of central controllers positioned proximate the aircraft 100.

Figure 10:
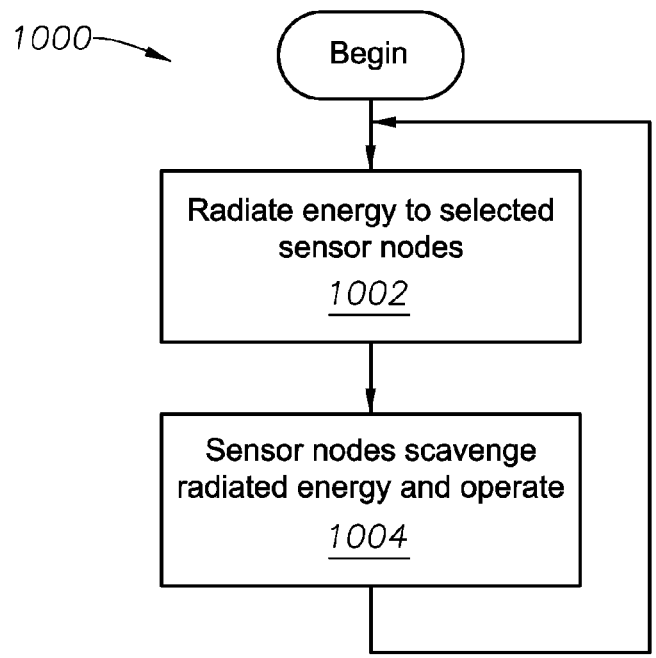
FIG. 10 is a flow chart illustration of an exemplary embodiment of a method of operating an aircraft monitoring system.

Referring to FIG. 10, in an exemplary embodiment, the system 900 implements a method 1000 of monitoring an aircraft in which, in 1002, selected ones of the sensor nodes 102 are radiated with energy by operating the energy radiator 902. In an exemplary embodiment, the amount of energy radiated in 1002 is selected to provide at least a threshold level of energy that may be scavenged by the selected sensor nodes 102 thereby permitting a predetermined level of desired functionality to be achieved by the sensor nodes.

In 1004, the selected ones of the sensor nodes 102 scavenge the radiated energy using the power supplies 102. In an exemplary embodiment, at least some of the scavenged radiated power is stored in an energy storage device such as, for example, a power storage battery and/or a capacitor provided in at least some of the power supplies. In this manner, a relatively short burst of radiated energy may provide functionality of the selected sensors nodes 102 for an extended period of time.

In an exemplary embodiment, the method 1000 is implemented as part of a static test of the aircraft 108 while the aircraft is housed within a hangar.

In an exemplary embodiment, the energy radiator 902 may radiate electromagnetic energy using a planar wave whose energy level does not substantially decay with distance. In an exemplary embodiment, the energy radiator 902 may include a phased array antenna for radiating energy. In an exemplary embodiment, the energy radiator 902 may include an arbitrarily large antenna and/or one or more directional antennas.

In an exemplary embodiment, the energy radiator 902 may radiate a large enough pulse of energy such that the energy storage devices such as, for example, the batteries 102aa and/or capacitors of the power supplies 102 of the sensor nodes 102 are fully charged such that continued static testing of the aircraft 108 may continue with the need for further radiation of energy to the sensor nodes.

In an exemplary embodiment, the energy radiator 902 may include a light source operably coupled to a leaky fiber optic cable that is positioned proximate the sensor nodes 102 to which it is desired to radiate energy. In an exemplary embodiment, the energy radiator 902 may include a source of thermal energy that may create temperature gradients within the aircraft 108 that may be used by the power supplies 102a of the sensor nodes 102 to generate energy.

In an exemplary embodiment, the energy radiated by the energy radiator 902 is selected to include forms of energy that will not effect the structure and/or the measurements to be taken of the aircraft 100.

Figure 11:
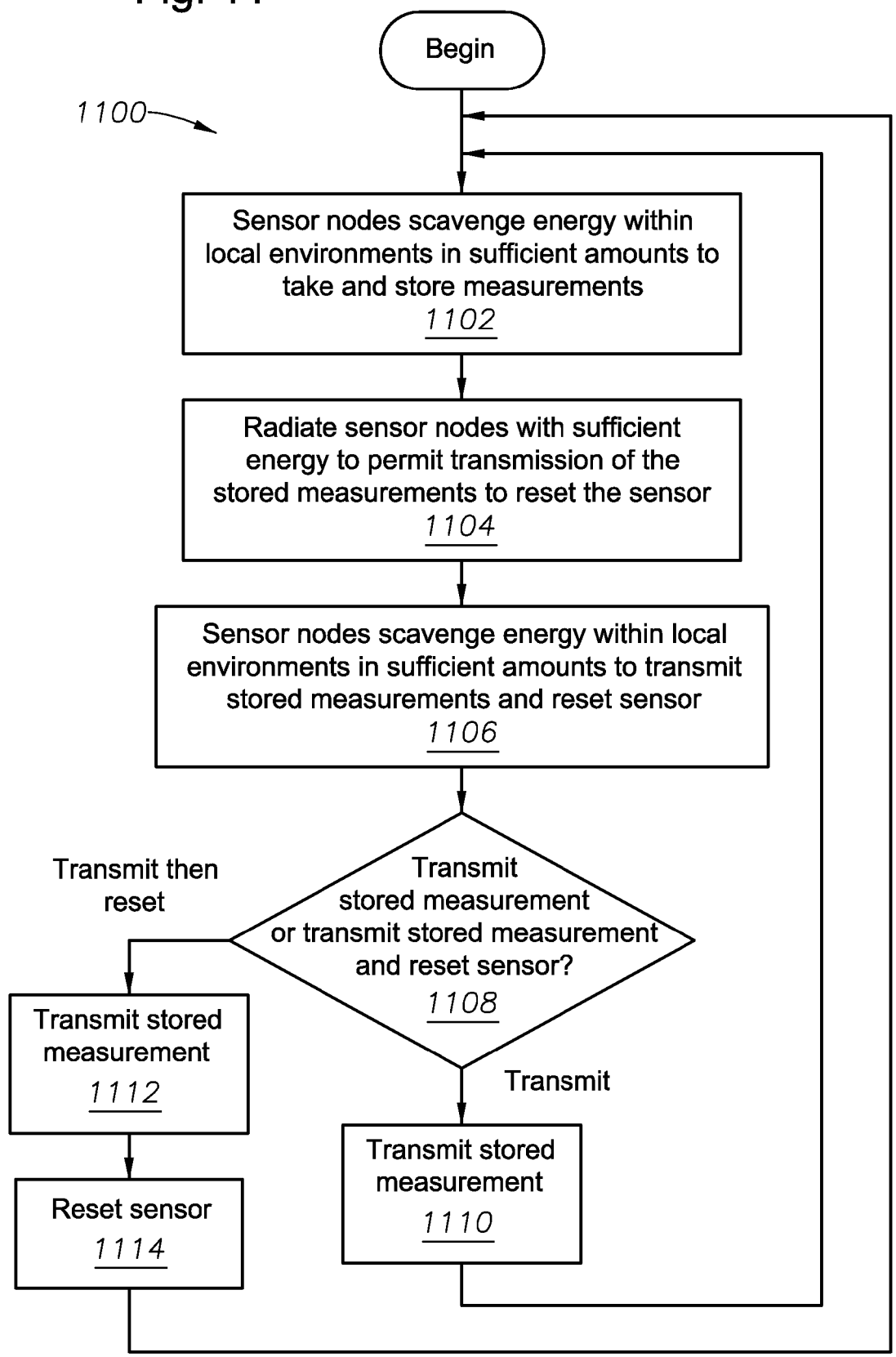
FIG. 11 is a flow chart illustration of an exemplary embodiment of a method of operating an aircraft monitoring system.
Figure 12:
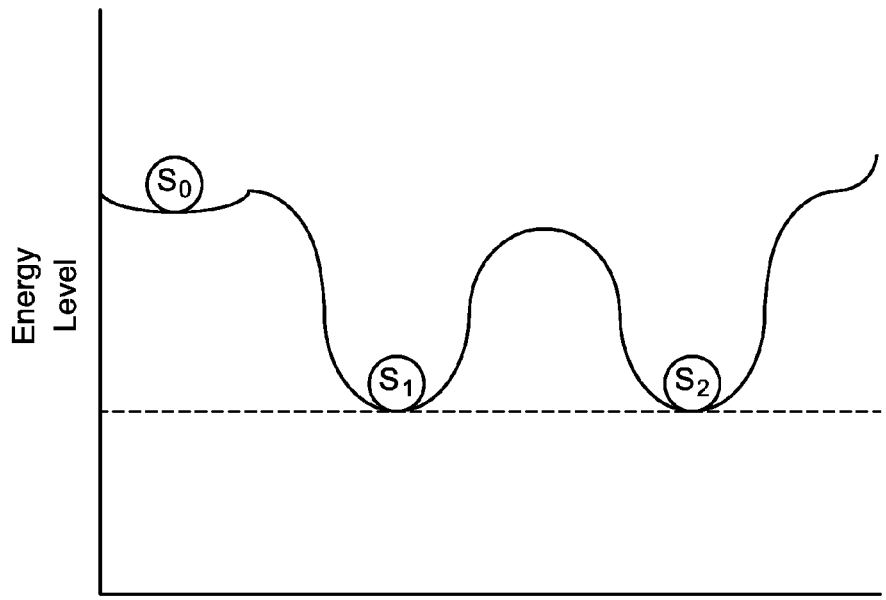
FIG. 12 is a graphical illustration of an exemplary embodiment of a sensor of a sensor node that includes one or more stable operating states.

Referring to FIG. 11, in an exemplary embodiment, the system 100 implements a method 1100 of monitoring an aircraft in which, in 1102, the sensor nodes 102 scavenge sufficient energy from the local environment to permit the sensors 102f of the sensor nodes to sense one or more operating conditions and store the measured operating condition within the sensor and/or the memory 102i. In an exemplary embodiment, in 1102, the sensors 102f of the sensor nodes 102 recognize that a threshold measured value has been obtained and thereby latch to that sensed value In an exemplary embodiment, as illustrated in FIG. 12, the sensors 102f of the sensor nodes 102 are provided with one or more stable operating states that are each reflective of a value of an operating condition. For example, as illustrated in FIG. 12, one or more of the sensors 102f of the sensor nodes 102 may include an initial operating state $S_0$. Upon the sensing of an operating condition, which would include some form of input energy to the sensor 102f, the operational state may then change to a stable sensed state $S_1$. The sensor 102f of the sensor node 102 would remain in this stable latched operational state unless and until another event reflective of a change in operating conditions, which would include some form of input energy to the sensor 102f, occurred which would move the sensor to a new stable operational state S2. In this manner, the sensor 102f of the sensor 102 would latch onto the sensed operational state and the sensor could be a mechanical latch and/or an electronic latch. In an exemplary embodiment, the number of stable operational states could be any value and such value could determine the level of granularity in the sensor 102f. In an exemplary embodiment, the number of stable operational states also may be used to provide an electrical and/or mechanical analog to digital converter in which the number of stable operational states of the sensor 102f determines the number of bits in the analog to digital converter.

In an exemplary embodiment, the sensors 102f of one or more of the sensor nodes 102 are further adapted to stored measure values of operating conditions using the energy associated with the operating condition itself. In this manner, the sensors 102f are able to store stored measure values of operating conditions using the energy associated with the operating condition for indefinite periods of time. For example, as illustrated in FIG. 12, the sensor 102f may include one or more stable operating states that are each entered into by injecting energy into the sensor, where the injected energy is the operating condition being measured.

Figure 13:
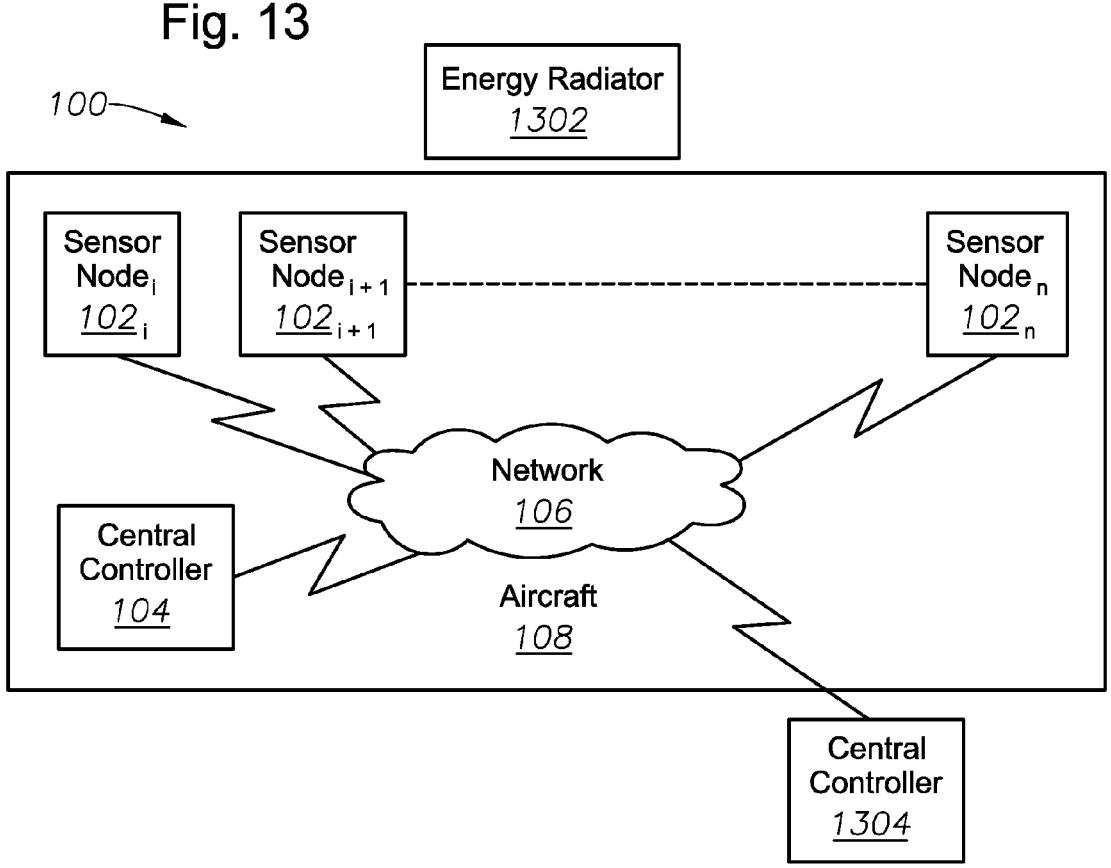
FIG. 13 is a schematic illustration of an exemplary embodiment of an aircraft monitoring system.

In an exemplary embodiment, in 1104, sensor nodes 102 are then radiated with energy in sufficient amounts to permit the sensor nodes to transmit the stored measurements and to reset the sensors 102f. In an exemplary embodiment, in 1104, as illustrated in FIG. 13, the sensor nodes 102 are radiated with energy in sufficient amounts to permit the sensor nodes to transmit the stored measurements by operating an energy radiator 1302 proximate the sensor nodes. In an exemplary embodiment, the design and operation of the energy radiator 1302 is substantially the same as the energy radiator 902.

In an exemplary embodiment, in 1106, the sensor nodes 102 scavenge the radiated energy using the power supplies 102. In an exemplary embodiment, at least some of the scavenged radiated power is stored in an energy storage device such as, for example, a power storage battery and/or a capacitor provided in at least some of the power supplies. In this manner, a relatively short burst of radiated energy may provide functionality of the selected sensors nodes 102 for an extended period of time. In an exemplary embodiment, in 1106, the sensor nodes 102 scavenge the radiated energy using the power supplies 102 in sufficient amount to permit the sensor nodes to transmit the stored measurements and to reset the sensor 102f.

In an exemplary embodiment, in 1108, the sensor nodes 102 determine whether to transmit the stored measurements or, in the alternative, to transmit the stored measurements and then reset the sensor 102f. In an exemplary embodiment, each sensor 102 will be programmed by a user of the system 100 in order to determine which action should be taken. Alternatively, the desired action to be taken may be altered by downloading instructions to the sensor nodes 102 and/or may be adaptively determined as a function of the type or location of the sensor 102f of the sensor node, the magnitude of the stored measurements, or other factors.

If a particular sensor node 102 has been instructed to only transmit the stored measurements, then, in 1110, the sensor node will only transmit the stored measurements to one or more of the central controllers 104. In an exemplary embodiment, in 1110, the transmission of the stored measurements by the sensor node may be a singlecast or multicast transmission, and may, for example, be transmitted using data packets protocols.

If a particular sensor node 102 has been instructed to transmit the stored measurements and reset the sensor 102f, then, in 1112, the sensor node will transmit the stored measurements to one or more of the central controllers 104 and then the sensor node 102 will then reset the associated sensor 102f in 1114. In an exemplary embodiment, in 1112, the transmission of the stored measurements by the sensor node may be a singlecast or multicast transmission, and may, for example, be transmitted using data packets protocols. In an exemplary embodiment, in 1114, the sensor node 102 will reset the sensor 102f by, for example, resetting the operational state of the sensor to an earlier operational state. In an exemplary embodiment, in 1114, the sensor node 102 may only reset the sensor 102f by, for example, resetting the operational state of the sensor to an earlier operational state if the sensor node receives an acknowledgement of the receipt of the stored measurements from the central controller 104.

In an exemplary embodiment, as illustrated in FIG. 13, in 1110 and/or 1112, the sensors 102 and/or the central controllers 104 may transmit the stored measurements to one or more external central controllers 1304. In an exemplary embodiment, the energy radiator 1302 may include, or at least be operably coupled to, the central controller 1304. In this manner, a portable device that may include both the energy radiator 1302 and the central controller 1304 may be used to wand over selected sensor nodes 102 to thereby interrogate the sensor nodes, capture the stored measurements contained therein, and, if required, also reset the sensors 102f in one or more of the selected sensor nodes 102.

Figure 14A:
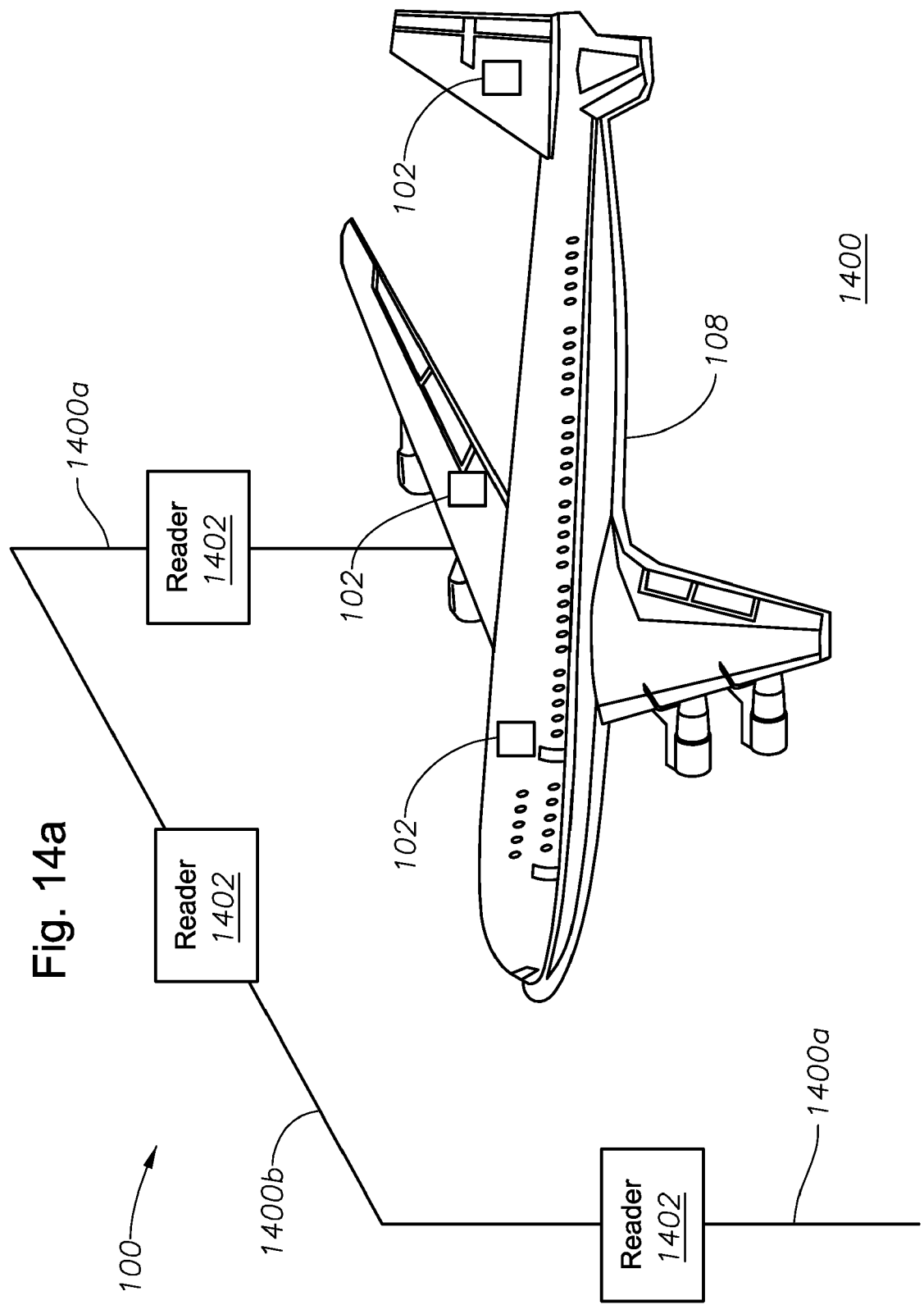
FIG. 14a is a schematic illustration of an exemplary embodiment of an aircraft monitoring system.
Figure 14B:
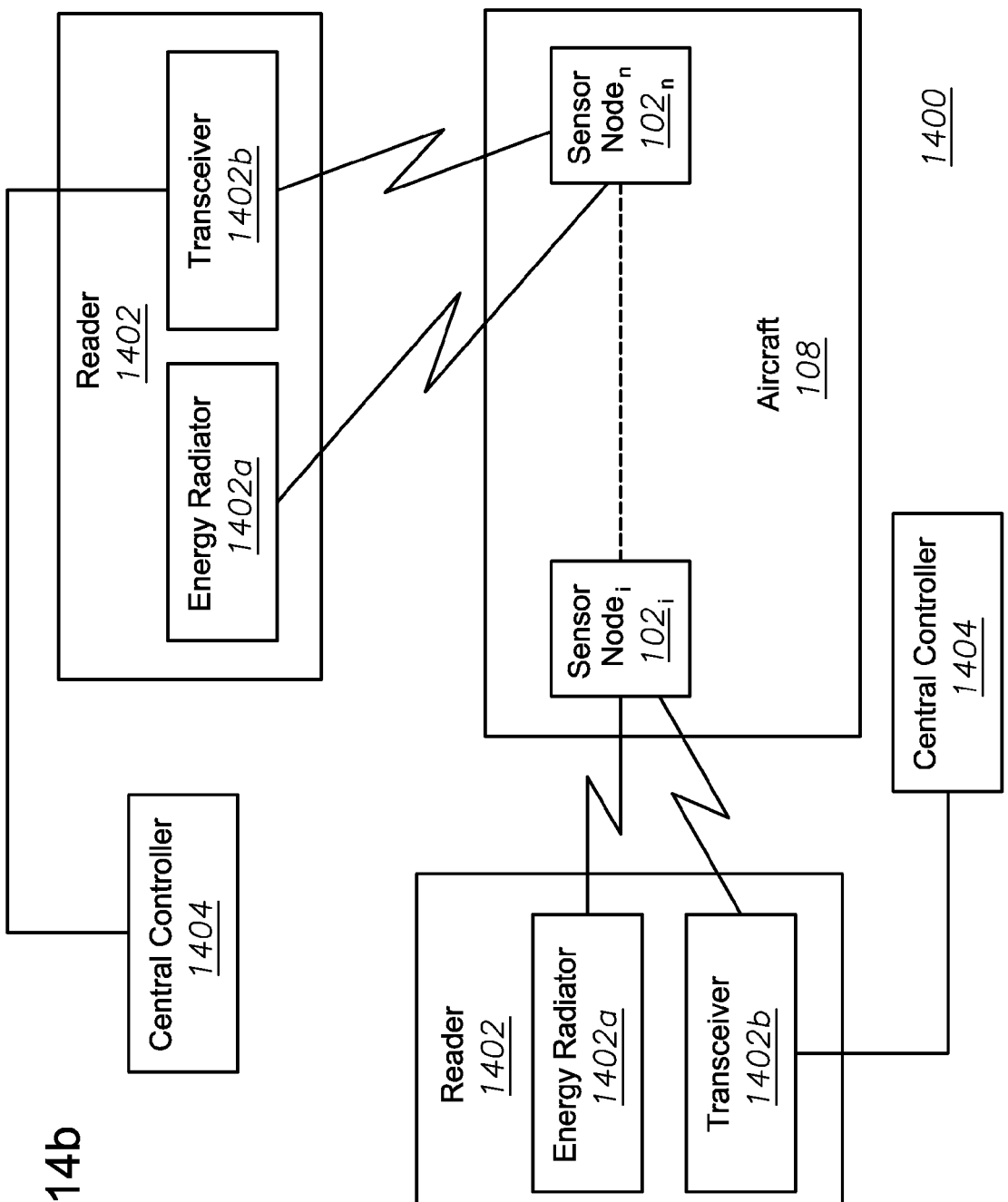

In an exemplary embodiment, as illustrated in FIGS. 14a and 14b, the method 1100 may be used, for example, to provide a regular diagnostic program for the aircraft 108 by mounting readers 1402 at one or more fixed locations such as, for example, in the walls and ceiling, 1400a and 1400b, respectively, of an aircraft hangar 1400.

In an exemplary embodiment, each of the readers 1402 may include an energy radiator 1402a for transmitting energy toward the sensor nodes 102 and a transceiver 1404b for communicating with the sensor nodes and one or more central controllers 1404. In an exemplary embodiment, the energy radiators 1402a are substantially identical in design and operation as the energy radiator 1302. In an exemplary embodiment, the readers 1402 are further operably coupled to one or more central controllers 1404. In an exemplary embodiment, the central controllers 1404 are substantially identical in design and operation as the central controller 1304.

In an exemplary embodiment, as the aircraft 108 is moved into or out of the hangar 1400, energy is directed at the sensor nodes 102 using the energy radiators 1402a thereby providing sufficient energy to permit operation of the sensor nodes. As a result, in an exemplary embodiment, the sensor nodes may sense one or more operating conditions of the aircraft 108 and the measurements obtained thereby by the sensors 102f of the sensor nodes may be extracted for processing by the central controllers 1404 to determine the health of the aircraft such as, for example, as implemented in the method 1100.

In an exemplary embodiment, the method 1100 may be used, for example, to provide a regular diagnostic program for a carrier based aircraft 108 by mounting the energy radiator 1302 and the central controller 1304 at a fixed location such as, for example, the aircraft elevator on the carrier. Then, as the aircraft 108 is moved onto or off of the deck of the carrier, the stored measurements within the sensors 102f of the sensor nodes 102 may be extracted for processing by the central controller 1304 to determine the health of the carrier based aircraft.

Figure 15:
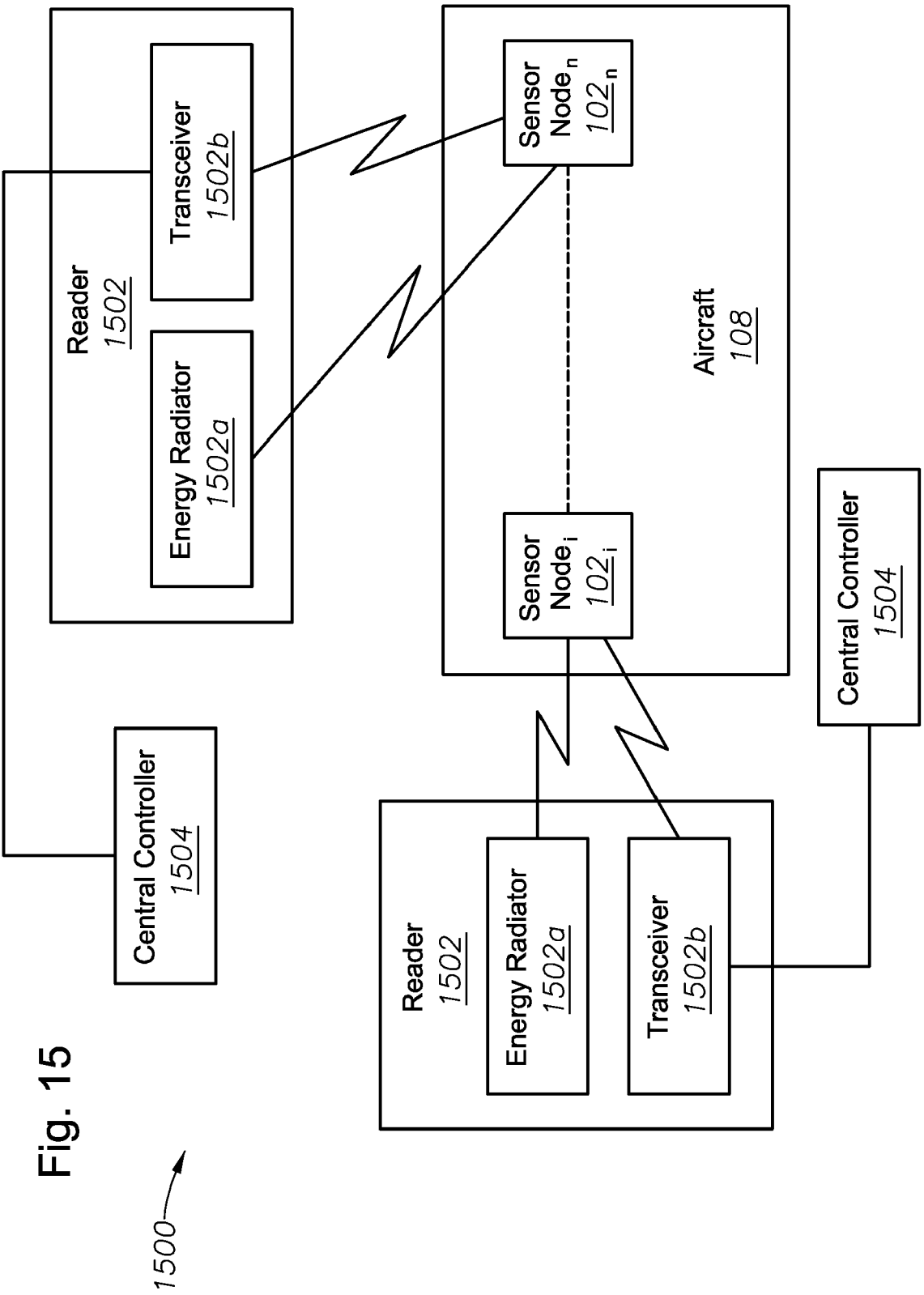
FIG. 15 is a schematic illustration of an exemplary embodiment of an aircraft monitoring system.

Referring now to FIG. 15, an exemplary embodiment of a system 1500 for monitoring an aircraft that includes one or more readers 1502 that are positioned proximate the aircraft 108. Each of the readers 1502 include an energy radiator 1502a and a transceiver 1502b. In an exemplary embodiment, the energy radiators 1502a of the readers 1502 are adapted to irradiate the sensor nodes 102 of the aircraft with energy and the transceivers 1502b of the readers are adapted to communicate with the sensor nodes and one or more central controllers 1504. In an exemplary embodiment, one or more of the readers 1502 and central controllers 1504 may be positioned within or outside of the aircraft 108 and may be stationary or portable.

In an exemplary embodiment, during the operation of the system 1500, the system may implement one or more of the methods of the exemplary embodiments.

Figure 16:
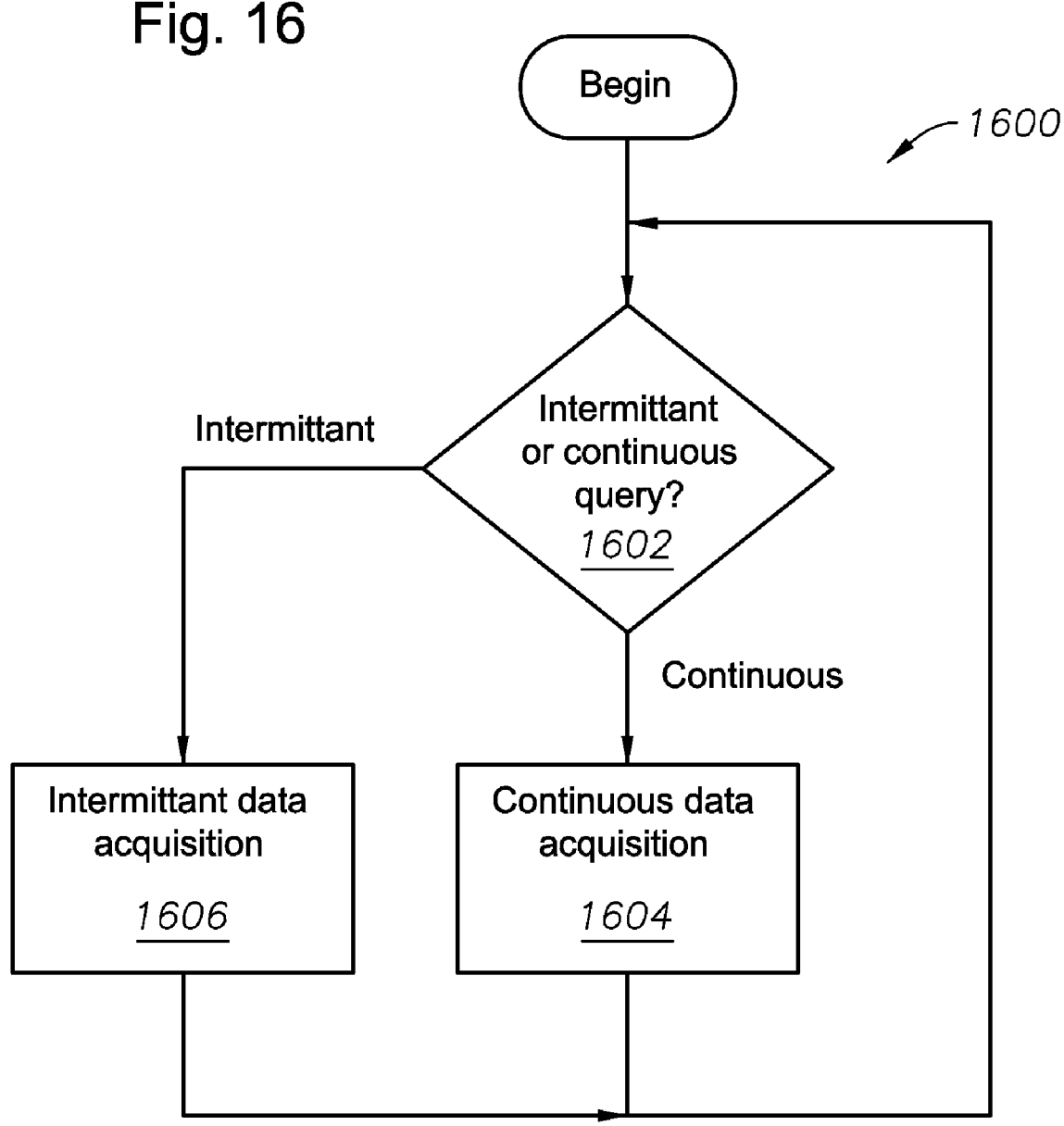
FIG. 16 is a flow chart illustration of an exemplary embodiment of a method of monitoring an aircraft.

Referring now to FIG. 16, in an exemplary embodiment, during operation of the system 1500, the system implements a method 1600 of monitoring an aircraft in which, in 1602, the system determines if the acquisition of data from the sensor nodes 102 by the readers 1502 will be continuous or intermittent. If the acquisition of data from the sensor nodes 102 by the readers 1502 will be continuous, then the system 1600 operates the readers 1502 to continuously acquire data from the sensor nodes 102. Alternatively, if the acquisition of data from the sensor nodes 102 by the readers 1502 will be intermittant, then the system 1600 operates the readers 1502 to intermittently acquire data from the sensor nodes 102. In an exemplary embodiment, the intermittent acquisition of data from the sensor nodes 102, in 1606, may be provided by acquiring data from the sensor nodes during, for example, preflight preparation of the aircraft 108, flight of the aircraft, and/or upon the landing of the aircraft. In an exemplary embodiment, the acquisition of data regarding one or more operational conditions of the aircraft 108 by the sensor nodes 102 may be provided using one or more aspects of the exemplary embodiments.

Figure 17:
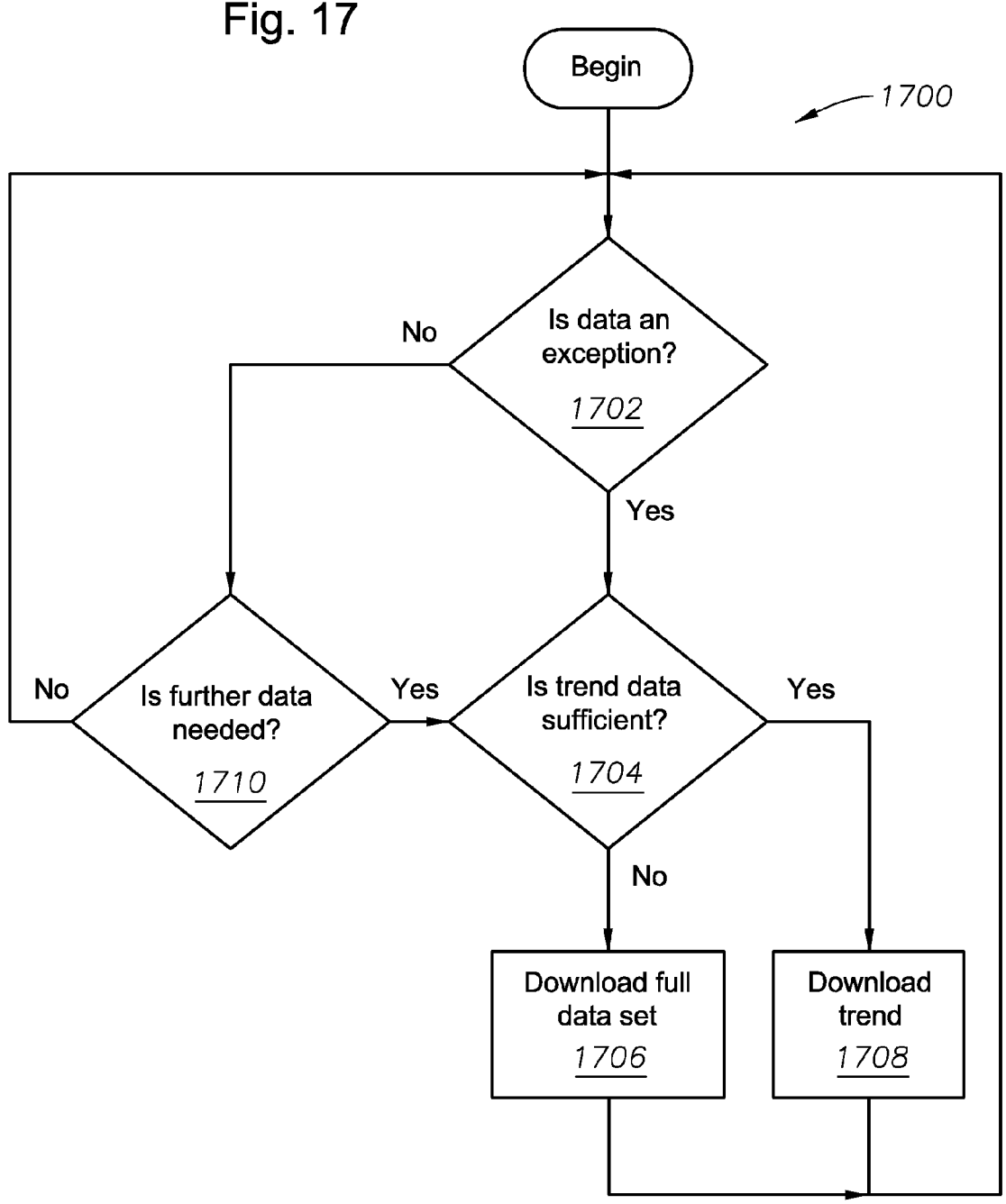
FIG. 17 is a flow chart illustration of an exemplary embodiment of a method of monitoring an aircraft.

Referring now to FIG. 17, in an exemplary embodiment, during the operation of the system 1500, the system implements a method 1700 of monitoring an aircraft in which, in 1702, the system determines if data received from one or more of the sensor nodes 102 is exception data. If the system 1500 determines that the data received from one or more of the sensor nodes 102 is exception data, then the system determines if corresponding trend data is sufficient in 1704. If the system 1500 determines that corresponding trend data is not sufficient, then a corresponding full data set is downloaded from the corresponding sensor nodes 102 in 1706. Alternatively, if the system 1500 determines that the corresponding trend data is sufficient, then the system downloads the corresponding trend data from the corresponding sensor nodes 102 in 1708.

Alternatively, in 1702, if the system 1500 determines that the data received from one or more of the sensor nodes 102 is not exception data, then, in 1710, the system determines if, regardless of the determination that the data received from one or more of the sensor nodes is not exception data, the system needs more corresponding data. If the system 1500 determines that more corresponding data is needed, then, in 1704, the system determines if corresponding trend data is sufficient in 1704.

In an exemplary embodiment, the methods 1600 and 1700 may be implemented separately, or in combination with each other, or in combination with one or more of the other exemplary embodiments.

It is understood that variations may be made in the above without departing from the scope of the invention. For example, the teachings of the exemplary embodiments may be applied to monitoring an aircraft, a ship, a vehicle, a building, the environment, or any other application in which a distributed monitoring system would provide value. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A distributed monitoring system for monitoring one or more operating conditions of a structure, comprising:
   one or more sensor nodes coupled to the structure, each sensor node comprising:
      a power supply adapted to scavenge energy directed at the power supply;
      a sensor operably coupled to the power supply for sensing one or more operating conditions of the structure in the immediate environment; and
      a communications interface operably coupled to the power supply and the sensor for communicating the sensed operating conditions of the structure; and
   one or more readers positioned proximate the sensor nodes, each reader comprising a transceiver adapted to communicate with the sensor nodes
   the readers being adapted to acquire, from the sensor nodes, data representative of the operating conditions, either intermittently or continuously, and the readers being further adapted to determine if data received from the one or more sensor nodes is an exception and, if the data is an exception, determine if trend data would be sufficient.

2. The system of claim 1, wherein each reader comprising an energy radiator adapted to radiate energy at the power supplies.

3. The system of claim 1, wherein the structure comprises at least a portion of an aircraft.

4. The system of claim 3, wherein the readers are adapted to acquire data from the sensor nodes representative of the operating conditions during a qualification testing of the aircraft.

5. The system of claim 3, wherein the readers are adapted to acquire data from the sensor nodes representative of the operating conditions during flight of the aircraft.

6. The system of claim 3, wherein the readers are adapted to acquire data from the sensor nodes representative of the operating conditions prior to or after flight of the aircraft.

7. The system of claim 6, wherein one or more of the readers are affixed to a manufacturing facility for manufacturing the aircraft.

8. The system of claim 6, wherein one or more of the readers are affixed to a hangar structure.

9. The system of claim 6, wherein one or more of the readers are affixed to an aircraft carrier.

10. The system of claim 1, wherein the structure comprises at least a portion of a vehicle.

11. The system of claim 1, wherein the structure comprises a sub-component of a larger structure.

12. The system of claim 1, if one or more of the readers determine that trend data would be sufficient, then one or more of the readers download trend data from one or more of the sensor nodes.

13. The system of claim 1, if one or more of the readers determine that trend data would not be sufficient, then one or more of the readers download a full data set from one or more of the sensor nodes.

14. The system of claim 1, if one or more of the readers determine that data received from one or more sensor nodes is not an exception, then one or more of the readers determine if further data is needed from one or more of the sensor nodes.

15. A method of operating a system for monitoring one or more operating conditions of a structure, comprising:
   providing sensor nodes at locations around the structure for sensing operating conditions of the structure;
   positioning the structure proximate another structure;
   directing radiated energy from the other structure at one or more of the sensor nodes;
   scavenging the radiated energy at one or more of the sensor nodes;
   using the scavenged energy at one or more of the sensor nodes to transmit sensed operating conditions from one or more of the sensor nodes to one or more readers either intermittently or continuously;
   determining if data received by the other structure, from the one or more sensor nodes, is an exception; and
   if the data is determined to be an exception, determining if trend data would be sufficient.

16. The method of claim 15, wherein the structure comprises at least a portion of an aircraft.

17. The method of claim 16, further comprising transmitting sensed operating conditions from one or more of the sensor nodes to the other structure during flight of the aircraft.

18. The method of claim 16, further comprising transmitting sensed operating conditions from one or more of the sensor nodes to the other structure prior to or after flight of the aircraft.

19. The method of claim 18, wherein other structure comprises a hangar structure.

20. The method of claim 18, wherein other structure comprises an aircraft carrier.

21. The method of claim 15, wherein the structure comprises at least a portion of a vehicle.

22. The method of claim 15, wherein the structure comprises a sub-component of a larger structure.

23. The method of claim 1, further comprising: if the other structure determines that trend data would be sufficient, then the other structure downloading trend data from one or more of the sensor nodes.

24. The method of claim 1, further comprising: if the other structure determines that trend data would not be sufficient, then the other structure downloading a full data set from one or more of the sensor nodes.

25. The method of claim 1, further comprising: if the other structure determines that data received from one or more sensor nodes is not an exception, then the other structure determining if further data is needed from one or more of the sensor nodes.

26. The method of claim 16, further comprising transmitting sensed operating conditions from one or more of the sensor nodes to the other structure during manufacture of the aircraft.

27. The method of claim 16, further comprising transmitting sensed operating conditions from one or more of the sensor nodes to the other structure during qualification testing of the aircraft.

* * * * *